United States Patent
Yuge et al.

(10) Patent No.: US 9,387,715 B2
(45) Date of Patent: Jul. 12, 2016

(54) ORIENTED FILM PRINTING PLATE AND MANUFACTURING METHOD FOR LIQUID CRYSTAL DISPLAY DEVICE

(71) Applicant: Japan Display Inc., Tokyo (JP)

(72) Inventors: Shunsuke Yuge, Tokyo (JP); Hiroshi Miyairi, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 232 days.

(21) Appl. No.: 14/108,388

(22) Filed: Dec. 17, 2013

(65) Prior Publication Data
US 2014/0168596 A1    Jun. 19, 2014

(30) Foreign Application Priority Data

Dec. 19, 2012    (JP) .................................. 2012-276435

(51) Int. Cl.
| | |
|---|---|
| *G02F 1/1337* | (2006.01) |
| *B41N 1/12* | (2006.01) |
| *B41M 1/04* | (2006.01) |
| *B41C 1/00* | (2006.01) |
| *B41C 1/05* | (2006.01) |
| *B41M 1/26* | (2006.01) |

(52) U.S. Cl.
CPC .. *B41N 1/12* (2013.01); *B41M 1/04* (2013.01); *G02F 1/1337* (2013.01); *G02F 1/133711* (2013.01); *G02F 1/133784* (2013.01); *B41C 1/003* (2013.01); *B41C 1/006* (2013.01); *B41C 1/05* (2013.01); *B41M 1/26* (2013.01); *G02F 1/133707* (2013.01)

(58) Field of Classification Search
CPC ............ G02F 1/1337; G02F 1/133711; G02F 1/133784
See application file for complete search history.

(56) References Cited

U.S. PATENT DOCUMENTS

| | | | |
|---|---|---|---|
| 2004/0038010 A1 | 2/2004 | Kim et al. | |
| 2004/0126540 A1* | 7/2004 | Byun | G02F 1/133784 428/156 |
| 2007/0091238 A1* | 4/2007 | Shin | G02F 1/1303 349/124 |

FOREIGN PATENT DOCUMENTS

| | | |
|---|---|---|
| JP | 6-305117 | 11/1994 |
| JP | 2004-78222 | 3/2004 |
| KR | 2003-0076885 | 9/2003 |
| KR | 10-2004-0062016 | 7/2004 |
| KR | 10-2005-0120081 | 12/2005 |

OTHER PUBLICATIONS

Communication issued in connection with corresponding Korean Patent Application No. 10-2013-157048, mailed Aug. 29, 2014, with English translation.

* cited by examiner

*Primary Examiner* — Phu Vu
(74) *Attorney, Agent, or Firm* — Typha IP LLC

(57) ABSTRACT

In order to prevent protruded parts formed on an oriented film print pattern of a printing plate for flexographic printing from being lost, a linear bank is formed on the periphery of one side of the oriented film print pattern where wiping work is started. The bank prevents the protruded part in the oriented film print pattern from being lost by the wiping work. The protruded parts are formed in a matrix in order to retain an oriented film liquid in the oriented film print pattern. Thickness irregularity of the oriented film due to presence of the bank is reduced by making the diameters of the protruded parts smaller in a peripheral region than in a central region of the oriented film print pattern and forming a space between the peripheral-side protruded parts and the bank.

12 Claims, 5 Drawing Sheets

ORIENTED FILM PRINTING PLATE AND MANUFACTURING METHOD FOR LIQUID CRYSTAL DISPLAY DEVICE

CLAIM OF PRIORITY

The present application claims priority from Japanese Patent Application JP 2012-276435 filed on Dec. 19, 2012, the content of which is hereby incorporated by reference into this application.

BACKGROUND OF THE INVENTION

1. Field of the Invention

The present invention pertains to a display device and more particularly relates to a liquid crystal display device manufacturing method for forming an oriented film by flexographic printing and allowing an increase of the yield of liquid crystal display devices, and a printing plate used in the flexographic printing.

2. Description of the Related Art

On a liquid crystal display panel used in a liquid crystal display device, a TFT substrate and a counter substrate are arranged. On the TFT substrate, pixels including pixel electrodes, thin film transistors (TFTs) and so forth are formed in a matrix. The counter substrate faces the TFT substrate and has color filters and so forth formed at locations corresponding to those of the pixel electrodes of the TFT substrate. A liquid crystal is nipped and held between the TFT substrate and the counter substrate. Then, an image is formed by controlling the transmittance of light through liquid crystal molecules per pixel.

In the liquid crystal display device, the liquid crystal molecule is initially oriented by the oriented films formed on the TFT substrate and the counter substrate, and the initially oriented state of the liquid crystal molecule is changed with an electric field which is formed between the pixel electrode and a counter electrode by applying an image signal to the pixel electrode, thereby controlling the quantity of light transmitted through the liquid crystal display panel. The direction of the initial orientation of the liquid crystal molecule is defined by performing a rubbing process or an optical orientation process on the oriented film.

In formation of the oriented film, an organic liquid material of a predetermined viscosity is applied onto the TFT substrate or the counter substrate, for example, by flexographic printing and thereafter a material of the oriented film is fired and imidized to form the oriented film. The flexographic printing of the oriented film is performed in the following manner. That is, the material of the oriented film is dripped onto a cylindrical anilox roll through an injection nozzle and then the material of the oriented film is uniformly applied onto the anilox roll using liquid spreading means (a doctor blade), and the uniformly applied material is transferred to a printing plate and then is printed from the printing plate onto the TFT substrate or the counter substrate.

In Japanese Patent Laid-Open No. Hei 6-305117, there is described a configuration that a variation in oriented film thickness is reduced by making the planar shape of a protruded part formed on an intersection of a lattice for retaining an oriented film liquid supplied from an anilox roll not circular but cruciform.

In Japanese Patent laid-Open No. 2004-78222, there is described a configuration that the density of protruded parts to be formed in a halftone dot or a lattice point of a printing plate is made denser on the periphery than at the center in order to prevent the thickness of the oriented film from increasing on the periphery.

SUMMARY OF THE INVENTION

FIG. 8 is a plan view illustrating an example of an oriented film print pattern 20 to be formed in numbers on a printing plate and corresponding to each liquid crystal display device. In FIG. 8, many protruded parts 21 are formed on the oriented film print pattern 20 in order to retain an oriented film liquid. The oriented film liquid is retained between the protruded parts 21 and is transferred onto a mother substrate to form an oriented film. FIG. 9 is an enlarged diagram of FIG. 8, exhibiting a planar shape approximating to the shape and the density of the protruded parts 21 on the actual oriented film print pattern 20.

Wiping work is performed on the printing plate in order to clean its surface before the oriented film is printed. Since the printing plate is made of an elastic acrylic resin, its strength is not sufficient and thus it has such a disadvantage that the protruded part is peeled off and lost when the wiping work is performed. The wiping work is performed from a direction of an arrow in FIG. 8 or FIG. 9.

In the above-mentioned case, losing or peeling of the protruded parts 21 is liable to occur particularly in the vicinity of an end of the oriented film print pattern 20 from which wiping is started. When the protruded part 21 is peeled off, the peeled-off protruded part 21 causes a foreign material failure (a failure caused by intrusion of a foreign material) to lead to a reduction in yield of the liquid crystal display devices.

The wiping work is performed when printing of the oriented film is started and is also performed before printing of the oriented film is restarted after it is once suspended. Since it becomes inevitable to perform the wiping work on the oriented film print pattern simply by suspending the oriented film printing work just for about 90 seconds, the frequency of the wiping work is increased.

The present invention aims to prevent the protruded part 21 formed on the oriented film print pattern 20 from being lost or peeled off by the wiping work in performing the wiping work on the oriented film print pattern 20 so as to prevent occurrence of the foreign material failure in the liquid crystal display device.

According to embodiments of the present invention, there are provided an oriented film printing plate and a manufacturing method for liquid crystal display device in order to overcome the above-mentioned disadvantage. Concrete measures are as follows.

(1) According to an embodiment of the present invention, there is provided an oriented film printing plate that retains an oriented film liquid supplied from an anilox roll and flexographically prints an oriented film on a substrate, wherein a plurality of oriented film print patterns are formed on the oriented film printing plate, each of the oriented film print patterns includes protruded parts formed in a matrix and a linear bank formed at least on one side of the periphery, and diameters of the protruded parts are made smaller in a peripheral region than in a central region of the oriented film print pattern and a space is formed between the protruded parts in the peripheral region and the linear bank.

(2) In the oriented film printing plate described in (1), the linear bank is formed on four sides including the above-mentioned one side.

(3) In the oriented film printing plate described in (1) or (2), d2/d1 is 20% to 70% where d1 is a diameter of the protruded part in the central region of the oriented film print pattern and d2 is a diameter of the protruded part in the peripheral region of the oriented film print pattern.

(4) In the oriented film printing plate described in (3), d2/d1 is 30% to 50% where d1 is the diameter of the protruded part in the central region of the oriented film print pattern and d2 is the diameter of the protruded part in the peripheral region of the oriented film print pattern.

(5) According to an embodiment of the present invention, there is provided a manufacturing method for a liquid crystal display device which includes a TFT substrate including a TFT, a pixel electrode and an oriented film and a counter substrate including an oriented film and in which a liquid crystal layer is nipped and held between the oriented film of the TFT substrate and the oriented film of the counter substrate, wherein the oriented film is formed by flexographic printing, and the flexographic printing is performed by using the oriented film printing plate described in (1), (2), (3) or (4).

According to the embodiments of the present invention, since the linear bank is formed on at least one side of the oriented film print pattern of the printing plate, it is allowed to prevent the protruded parts in the peripheral region of the oriented film print pattern from being lost and thus it is allowed to prevent a reduction in manufacture yield of the liquid crystal display devices caused by intrusion of foreign materials.

In addition, according to the embodiments of the present invention, since the diameters of the protruded parts are made smaller in the peripheral region of the oriented film print pattern than in the central region thereof and the space is formed between the protruded parts in the peripheral region and the linear bank, it is allowed to prevent the oriented film thickness from becoming non-uniform due to the bank formed on the periphery.

DETAILED DESCRIPTION OF THE PREFERRED EMBODIMENTS

In the following, the contents of the present invention will be described in detail using preferred embodiments.

Embodiment 1

Figure 1:
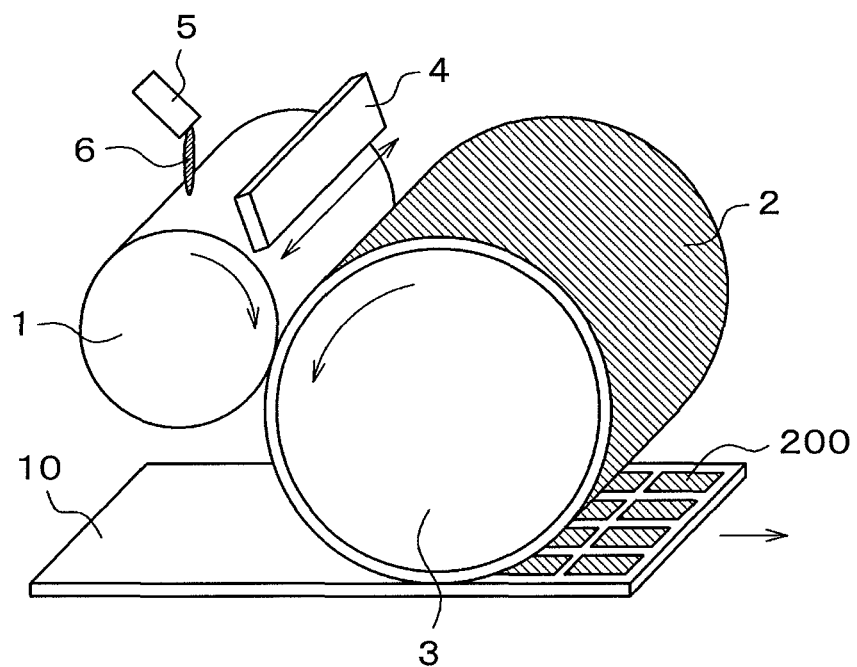
FIG. 1 is a perspective view illustrating an example of a configuration of a flexographic printing system.

FIG. 1 is a schematic diagram illustrating an example of a configuration of a flexographic printing system for an oriented film. In FIG. 1, an oriented film material 6 is dipped onto an anilox roll 1 through an injection nozzle 5. The injection nozzle 5 is scanned in an axial direction of the anilox roll 1 so as to uniformly apply the oriented film material 6 onto the anilox roll 1. As the anilox roll 1 rotates, a doctor blade 4 is swung in directions of arrows so as to more uniformly apply the oriented film material 6 onto the anilox roll 1.

The oriented film material 6 which has been applied onto the anilox roll 1 is transferred to a printing plate 2 wound on a plate cylinder 3 and then is transferred to a mother substrate 10, thereby printing an oriented film 200 onto the mother substrate 10. The printing plate 2 transfers the oriented film to the mother substrate 10 which is traveling in a direction of an arrow while rotating in a direction of an arrow.

Here, the mother substrate 10 is a general term for a mother TFT substrate with many TFT substrates formed or a mother counter substrate with many counter substrates formed. As illustrated in FIG. 1, many oriented films 200 are printed from the printing plate 2 onto the mother substrate 10. The individual oriented films 200 serve as the oriented films 200 of the individual TFT substrates or the individual counter substrates.

Figure 2:
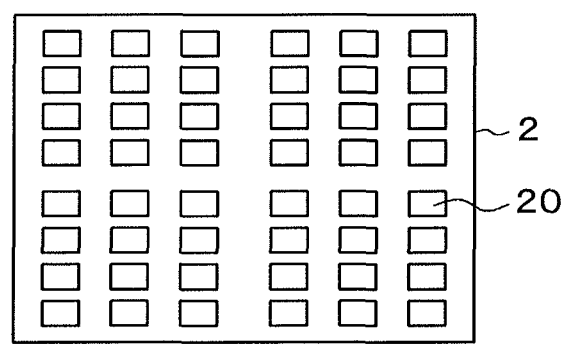
FIG. 2 a development view illustrating an example of an oriented film printing plate.
Figure 3:
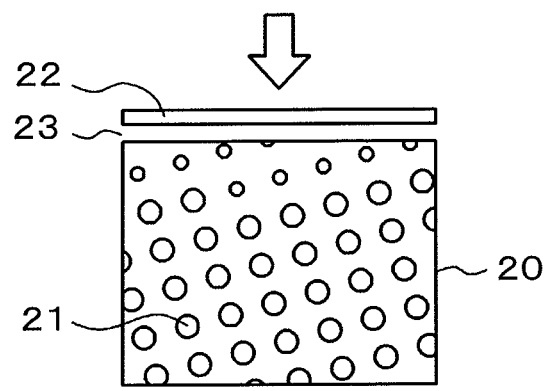
FIG. 3 is a plan view illustrating an example of an oriented film print pattern according to an embodiment 1 of the present invention.

FIG. 2 is a development view illustrating an example of the printing plate 2 before wound on the plate cylinder 3. In FIG. 2, many oriented film print patterns 20 are formed on the printing plate 2. FIG. 3 is a detailed diagram illustrating an example of each oriented film print pattern 20 in FIG. 2 and is a plan view illustrating the characteristics of the oriented film print pattern 20 according to the embodiment of the present invention. In FIG. 3, a linear bank 22 is formed on the outer side of one side of the oriented film print pattern 20.

Work of wiping the oriented film print pattern 20 which is to be performed at an initial stage of oriented film printing work or when the oriented film printing work is restarted after once suspended is performed from a direction of an arrow in FIG. 3. Since no strong force is applied onto the individual protruded parts 21 within the oriented film print pattern 20 owing to presence of the linear bank 22, occurrence of a phenomenon that the protruded parts 21 are peeled off by the wiping work is avoided.

On the other hand, since the bank 22 is linearly formed, it works strongly against peeling and is not lost by the wiping work. Therefore, it is allowed to avoid the foreign material failure by using the oriented film print pattern 20 according to the embodiment of the present invention. However, formation of the bank 22 leads to occurrence of thickness irregularity or the like in the oriented film.

As a countermeasure against the above, according to the embodiment of the present invention, thickness irregularity of the oriented film is avoided by making the planar diameters of the protruded parts 21 within the oriented film print pattern 20 smaller in the peripheral region than in the central region of the oriented film print pattern 20 and leaving a space 23 between the bank 22 and the protruded parts 21. That is, since the oriented film material (hereinafter, referred to as an oriented film liquid) is not allowed to exist on the part of the bank 22 situated on the periphery of the oriented film print pattern 20, the thickness of the oriented film tends to be reduced in its peripheral region.

As a countermeasure against the above, the diameters of the protruded parts are made small in the peripheral region of the oriented film print pattern 20. As a result, the area between the protruded parts 21 in the peripheral region is increased and thus it is allowed to increase the quantity of the oriented film liquid to be retained. In addition, the space 23 is formed between the protruded parts 21 and the linear bank 22 so as to retain the oriented film liquid in the space 23 and thus it is allowed to increase the quantity of the oriented film liquid to be applied onto the peripheral region of the oriented film. It is allowed to avoid occurrence of such a phenomenon that the thickness of the oriented film is reduced in the peripheral region by such a configuration as mentioned above.

Here, although the space 23 between the protruded parts 21 which are formed in a matrix and the linear bank 22 is illustrated larger exaggeratedly in FIG. 3 than it actually is, the actual space 23 may be made smaller because it is formed in order to retain the oriented film liquid therein. That is, it means that it is allowable that an interval of such an extent that the protruded parts 21 are not contiguous to the linear bank 22 is present as the space.

Figure 4:
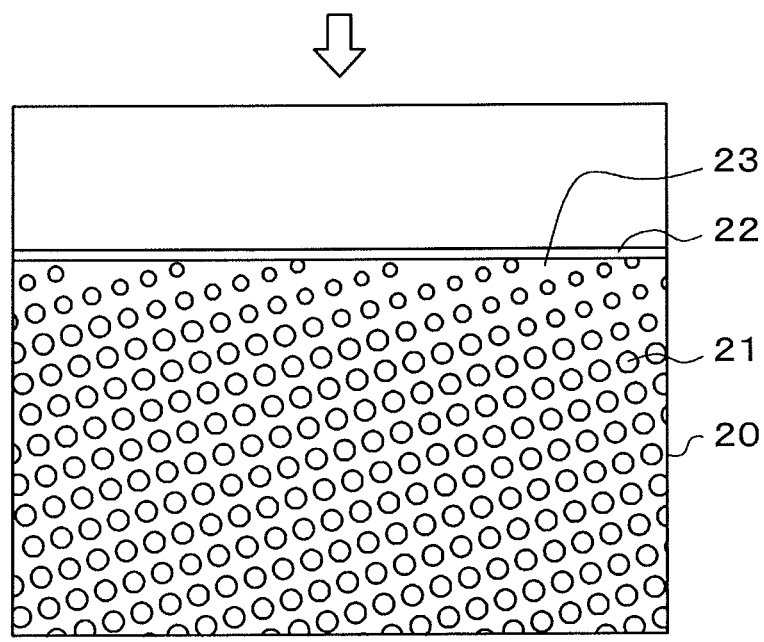
FIG. 4 is an enlarged diagram illustrating an example of the oriented film print pattern according to Embodiment 1 of the present invention.

FIG. 4 is an enlarged diagram approximating to the actual shape of the oriented film print pattern 20 illustrated in FIG. 3. In FIG. 4, the diameters of the protruded parts are smaller in the peripheral region than in a region in the vicinity of the center. Therefore, the area between the protruded parts 21 becomes lager in the peripheral region than in the central region and therefore it is allowed to retain more oriented film liquid accordingly. The space 23 is present between an array of the protruded parts 21 and the linear bank 22 and the oriented film liquid is to be retained in that part. As mentioned above, since the diameters of the protruded parts are made smaller in the peripheral region and the space is left between the linear bank 22 and the protruded parts 21 in the peripheral region, it is allowed to avoid occurrence of the phenomenon that the thickness of the oriented film is reduced in its peripheral region due to presence of the linear bank 22 and thus it is allowed to form the oriented film of a uniform film thickness.

Figure 5:
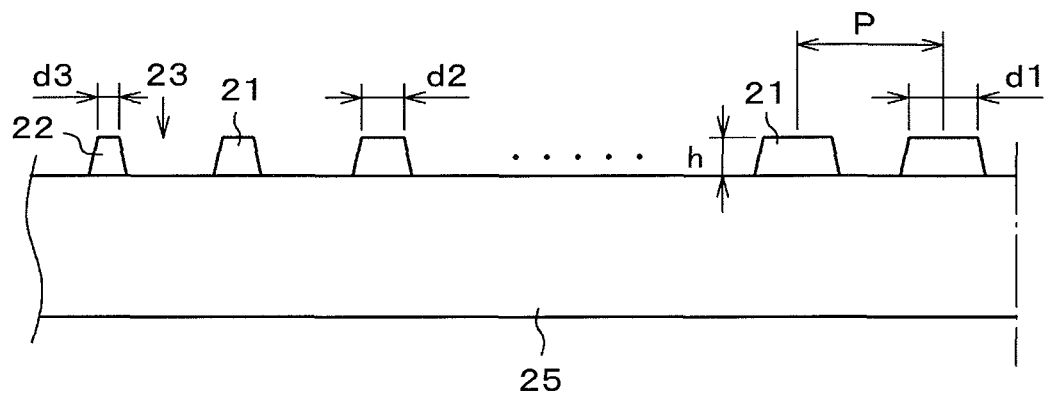
FIG. 5 is a sectional diagram illustrating an example of the oriented film print pattern according to Embodiment 1 of the present invention.

FIG. 5 is a sectional diagram illustrating an example of the oriented film print pattern 20 according to the embodiment of the present invention. In FIG. 5, the protruded parts 21 and/or the bank 22 is formed on a base 25. The protruded parts 21 and/or the bank 22 is formed by applying a photosensitive acrylic resin onto the base 25 and irradiating the photosensitive resin with ultraviolet rays to make required parts insoluble to a predetermined solution.

In FIG. 5, a diameter d1 of the protruded part in the vicinity of the center of the oriented film print pattern 20 is smaller than a diameter d2 of the protruded part 21 in its peripheral region. Incidentally, the diameter of the protruded part 21 means the diameter of its upper part when it is tapered. The diameter of the protruded part 21 in the vicinity of the center is, for example, about 60 μm and the diameter of the protruded part 21 in the peripheral region is, for example, about 25 μm. d2/d1 which is a ratio of the diameter d2 of the protruded part 21 in the peripheral region to the diameter d1 of the protruded part 21 in the central region is about 20% to 70% and more preferably about 30% to 50%. There is no change in pitch between the protruded parts 21 in the central region and the peripheral region of the oriented film print pattern 20 and it is, for example, about 20 μm.

The space 23 is present between the protruded parts 21 in an outermost peripheral region and the bank 22. When the oriented film is to be printed, the oriented film liquid is also retained in this space 23. A width d3 of the bank 22 is, for example, about 20 μm. Since the bank 22 is linearly formed even though the width d3 of the bank 22 is small as mentioned above, resistance to wiping is strong and the bank 22 is not lost in the wiping work.

On the other hand, a height h of the protruded part 21 is constant in both of the region in the vicinity of the center and the peripheral region of the oriented film print pattern 20 and is, for example, about 20 μm. In addition, a height of the bank 22 formed on the periphery is the same as the height of the protruded part 21 because they are formed by exposing the same photosensitive resin to light.

Figure 6:
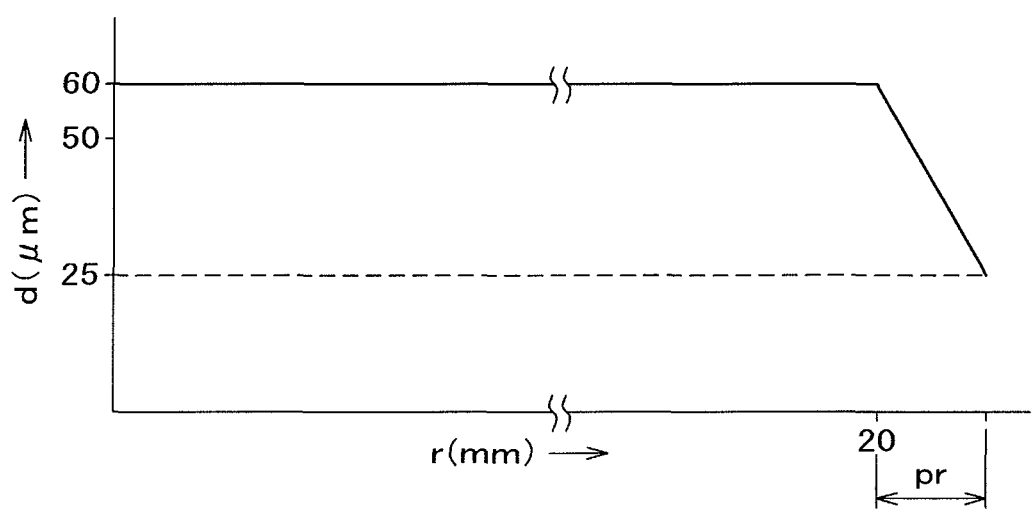
FIG. 6 is a graph illustrating an example of grading of diameters of protruded parts on the oriented film print pattern according to Embodiment 1 of the present invention.

FIG. 6 is a graph illustrating an example of a change in diameter of the protruded parts 21 formed on the oriented film print pattern 20. In FIG. 6, a distance r (mm) measured from the center of the oriented film print pattern 20 is plotted on the horizontal axis and a diameter d (μm) of the protruded part 21 defined in FIG. 5 is plotted on the vertical axis. In the example in FIG. 6, the diameters of the protruded parts 21 are fixed to about 60 μm in a region of a length of about 20 mm measured from the center toward the periphery and the diameters of the protruded parts 21 are graded in a region pr on the outer side of the 20-mm length region, that is, the diameters of the protruded parts 21 are reduced from, for example, about 60 μm to about 25 μm in the region pr. The length of the region pr is about 0.1 mm to 0.4 mm.

That is, the diameters of the protruded parts 21 are almost fixed in the central region of the oriented film print pattern 20 and are changed to about 40% of the diameters of those in its central region in its extreme peripheral region. The reason is such that the influence of the presence of the linear bank 22 on the film thickness of the oriented film reaches only the extreme peripheral region of the oriented film print pattern 20.

Embodiment 2

Figure 7:
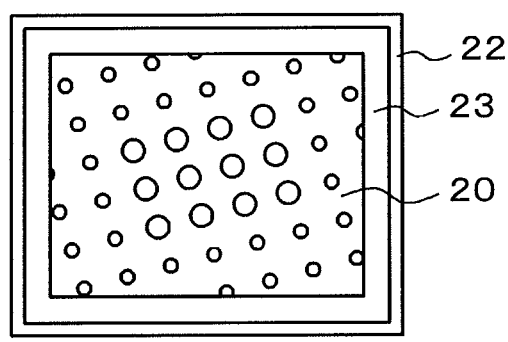
FIG. 7 is a plan view illustrating an example of an oriented film print pattern according to an embodiment 2 of the present invention.
Figure 8:
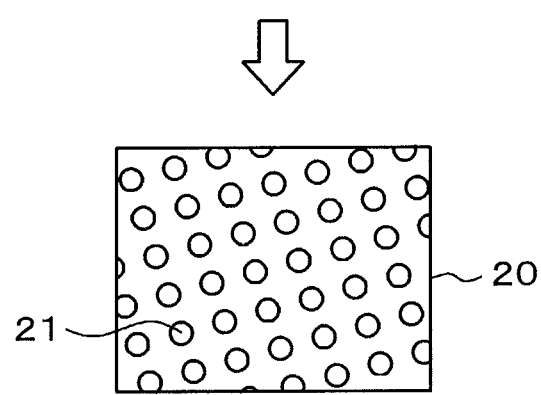
FIG. 8 is a plan view illustrating an example of an oriented film print pattern of related art.
Figure 9:
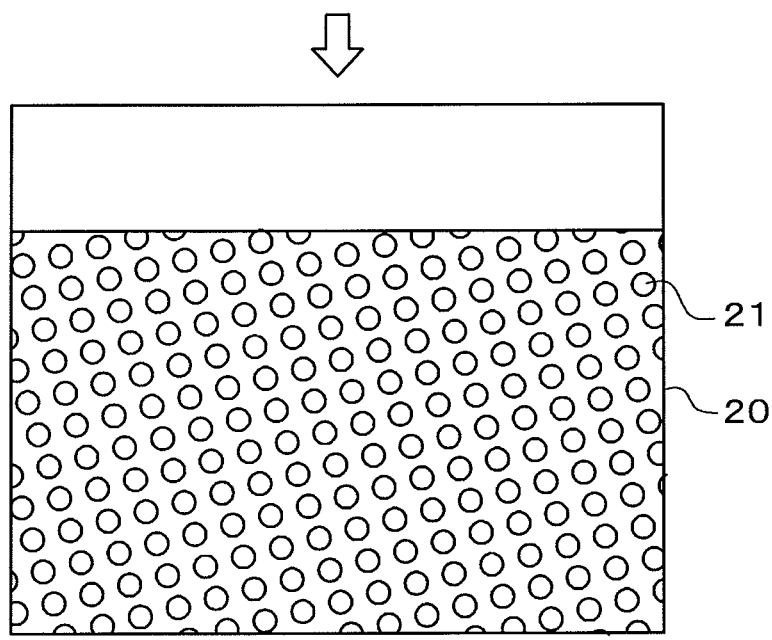
FIG. 9 is an enlarged diagram illustrating an example of the oriented film print pattern of the related art.

In Embodiment 1, a case that wiping of the oriented film print pattern 20 is performed only from one direction as illustrated in FIG. 3 has been described. However, in an actual device, in some cases it is desirable to configure so as to perform wiping of the oriented film print pattern 20 from any direction. FIG. 7 illustrates an example of the oriented film print pattern 20 coping with the above-mentioned case. In FIG. 7, the linear bank 22 is formed so as to surround the oriented film print pattern 20 including the protruded parts 21. The space 23 is formed between the bank 22 and the protruded parts 21. Although the space 23 is exaggeratedly illustrated in FIG. 7, it is allowable that a space of an extent that the protruded parts 21 are not formed contiguously to the bank 22 is left in reality.

In FIG. 7, the diameters of the protruded parts 21 are made larger in the region in the vicinity of the center and smaller in the peripheral region. A way of changing the diameters of the protruded parts 21 is the same as that in FIG. 5 and FIG. 6 of Embodiment 1. That is, Embodiment 2 is different from Embodiment 1 only in that in Embodiment 1, the diameters of the protruded parts 21 are changed from the center of the oriented film print pattern only in one direction, while in Embodiment 2, they are changed in four directions.

That is, since the diameters of the protruded parts 21 are changed in order to take measures to occurrence of the phenomenon that the oriented film is thinned in its peripheral region due to formation of the linear bank 22 on the periphery, a region where the diameters of the protruded parts are made small may be within the range of the peripheral region pr, that is, within the range of about 0.1 mm to 0.4 mm. In addition, the reason why the space 23 is formed on each side is also the same as that described in Embodiment 1.

As described above, according to Embodiment 2 of the present invention, since it is allowed to perform the wiping work to be performed at the initial stage of the oriented film printing process or when the printing work is restarted after once suspended from any direction of the printed film print pattern, it is allowed to improve working efficiency.

What is claimed is:

1. An oriented film printing plate that retains an oriented film liquid supplied from an anilox roll and flexographically prints an oriented film on a substrate,
wherein
a plurality of oriented film print patterns are formed on the oriented film printing plate,
each of the oriented film print patterns includes protruded parts formed in a matrix and a linear bank formed at least on one side of the periphery,
diameters of the protruded parts are made smaller in a peripheral region than in a central region of the oriented film print pattern and a space is formed between the protruded parts in the peripheral region and the linear bank, and
a pitch of the protruded parts in the central region is the same as a pitch of the protruded parts in the peripheral region of the oriented film print pattern.

2. The oriented film printing plate according to claim 1, wherein the linear bank is formed on four sides including the one side.

3. The oriented film printing plate according to claim 1, wherein d2/d1 is 20% to 70% where d1 is a diameter of the protruded part in the central region of the oriented film print pattern and d2 is a diameter of the protruded part in the peripheral region of the oriented film print pattern.

4. The oriented film printing plate according to claim 2, wherein d2/d1 is 20% to 70% where d1 is a diameter of the protruded part in the central region of the oriented film print pattern and d2 is a diameter of the protruded part in the peripheral region of the oriented film print pattern.

5. The oriented film printing plate according to claim 3, wherein d2/d1 is 30% to 50% where d1 is the diameter of the protruded part in the central region of the oriented film print pattern and d2 is the diameter of the protruded part in the peripheral region of the oriented film print pattern.

6. The oriented film printing plate according to claim 4, wherein d2/d1 is 30% to 50% where d1 is the diameter of the protruded part in the central region of the oriented film print pattern and d2 is the diameter of the protruded part in the peripheral region of the oriented film print pattern.

7. A manufacturing method for a liquid crystal display device which includes a TFT substrate including a TFT, a pixel electrode and an oriented film and a counter substrate including an oriented film and in which a liquid crystal layer is nipped and held between the oriented film of the TFT substrate and the oriented film of the counter substrate,
wherein the oriented film is formed by flexographic printing, and
the flexographic printing is performed by using the oriented film printing plate according to claim 1.

8. A manufacturing method for a liquid crystal display device which includes a TFT substrate including a TFT, a pixel electrode and an oriented film and a counter substrate including an oriented film and in which a liquid crystal layer is nipped and held between the oriented film of the TFT substrate and the oriented film of the counter substrate,
wherein the oriented film is formed by flexographic printing, and
the flexographic printing is performed by using the oriented film printing plate according to claim 2.

9. A manufacturing method for a liquid crystal display device which includes a TFT substrate including a TFT, a pixel electrode and an oriented film and a counter substrate including an oriented film and in which a liquid crystal layer is nipped and held between the oriented film of the TFT substrate and the oriented film of the counter substrate,
wherein the oriented film is formed by flexographic printing, and
the flexographic printing is performed by using the oriented film printing plate according to claim 3.

10. The oriented film printing plate according to claim 1, wherein the protruded parts of the oriented film print pattern in the peripheral region are configured to retain more oriented film liquid than the protruded parts of the oriented film print pattern in the central region.

11. The oriented film printing plate according to claim 1, wherein a height of the protruded parts in the central region of the oriented film print pattern is substantially the same as a height of the protruded parts in the peripheral region of the oriented film print pattern.

12. The oriented film printing plate according to claim 1, wherein a height of the protruded parts is substantially the same as a height of the linear bank.

* * * * *